United States Patent
Akutsu

[11] Patent Number: 5,983,075
[45] Date of Patent: Nov. 9, 1999

[54] RADIO COMMUNICATION SYSTEM BETWEEN A VEHICLE AND A ROADSIDE STATION

[75] Inventor: Eisaku Akutsu, Susono, Japan

[73] Assignee: Toyota Jidosha Kabushiki Kaisha, Toyota, Japan

[21] Appl. No.: 08/835,531

[22] Filed: Apr. 8, 1997

[30] Foreign Application Priority Data

Apr. 8, 1996 [JP] Japan ................................. 8-085210

[51] Int. Cl.⁶ ................................................. H04B 5/02
[52] U.S. Cl. ........................ 455/41; 455/523; 455/422; 455/14
[58] Field of Search ................... 455/14, 41, 523, 455/422, 7, 8, 11.1, 12.1, 18, 502, 503; 340/941, 933, 905; 343/842, 844; 246/5, 8, 34 A, 122 R, 187 B

[56] References Cited

U.S. PATENT DOCUMENTS

| | | | |
|---|---|---|---|
| 3,423,681 | 1/1969 | McKenna | 455/523 |
| 3,470,474 | 9/1969 | Rohrer | 455/523 |
| 4,471,356 | 9/1984 | Gidl . | |
| 4,782,342 | 11/1988 | Walton | 340/933 |
| 5,192,954 | 3/1993 | Brockelsby et al. . | |

FOREIGN PATENT DOCUMENTS

| | | |
|---|---|---|
| 655656 | 5/1995 | European Pat. Off. . |
| 3013931 | 10/1981 | Germany . |
| 53-087118 | 8/1978 | Japan . |
| 57-193137 | 11/1982 | Japan . |
| 61-262326 | 11/1986 | Japan . |
| 6-059727 | 3/1994 | Japan . |
| 7-046025 | 2/1995 | Japan . |

*Primary Examiner*—Reinhard J. Eisenzopf
*Assistant Examiner*—Lester G. Kincaid
*Attorney, Agent, or Firm*—Pillsbury Madison & Sutro LLP

[57] ABSTRACT

A radio communication system between a mobile station on a vehicle and a stationary station in which a uniform field intensity is obtained in a direction of a width of a road so that a good communication can be performed irrespective of a position of the vehicle on the road. A mobile station is provided on the vehicle. A stationary station communicating with the mobile station includes at least one pair of antennas located with the road therebetween so that the antennas generate an electric field having a substantially uniform intensity in a direction of a width of the road.

13 Claims, 10 Drawing Sheets

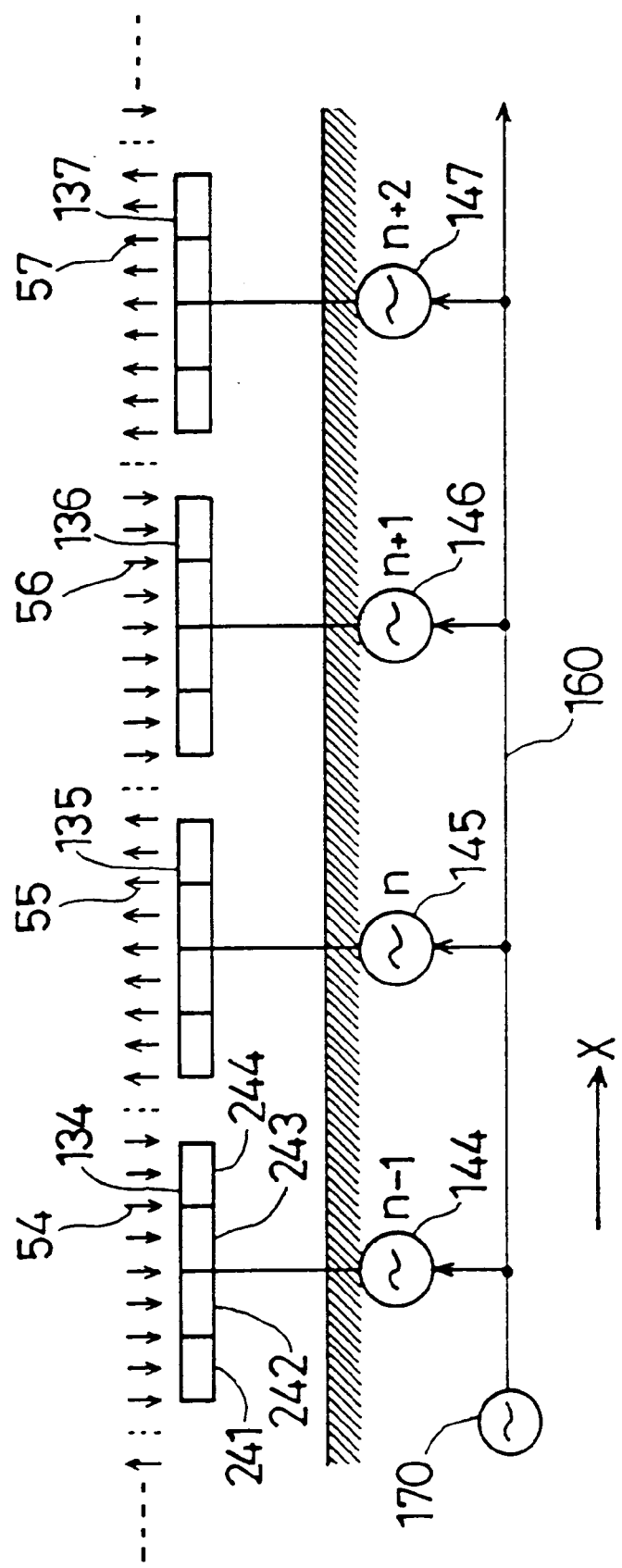

RADIO COMMUNICATION SYSTEM BETWEEN A VEHICLE AND A ROADSIDE STATION

BACKGROUND OF THE INVENTION

1. Field of the Invention

The present invention generally relates to a radio communication system for a mobile station and, more particularly, to a radio communication system between a vehicle moving on a road and a stationary station having an antenna located along the road.

2. Description of the Related Art

Conventionally, radio communication systems have been developed to provide communication between a mobile station provided on a vehicle moving on a road and a stationary station provided with an antenna installed along the road. For example, Japanese Laid-Open Patent Application No. 61-262326 discloses a radio communication system for a vehicle moving on a road. This radio communication system comprises a mobile station having a loop antenna provided on the vehicle and a stationary station having a loop antenna installed along the road. In this radio communication system, the axis of one of the loop antennas of the mobile station and the stationary station is parallel to the surface of the road, and the axis of the other of the loop antennas is perpendicular to the surface of the road. This arrangement of the loop antennas is determined so as to eliminate a dead zone formed between the fields formed by the loop antennas which is harmful to the radio communication.

In the conventional system, the loop antenna of the stationary station is located on one of the sides of the road. Thus, there is a problem in that a uniform field intensity cannot be obtained over the entire width of the road since the field intensity rapidly attenuates as a distance from the loop antenna of the stationary station is increased.

An AM radio antenna system provided in a highway tunnel comprises, as shown in FIG. 1, parallel antennas 10 and 11 which are provided on the ceiling of the tunnel. In this system, a uniform field intensity can be obtained along the moving direction of the mobile station or the longitudinal direction of the road. However, there is a problem in that the field intensity measured in a vertical direction or in a traverse direction greatly changes depending on a distance from the antennas 10 and 11 and a position relative to the antennas 10 and 11. Additionally, if an antenna of this type is constructed outside a tunnel, a construction of the antenna system becomes large since the antennas 10 and 11 must be located above the road. This results in an increase in a construction cost of the antenna system.

Another conventional antenna system is a leakage cable system used for, for example, a train railway as shown in FIG. 2. In FIG. 2, a leakage cable 14 runs along one of the sides of the pair of rails 12 and 13. In this system, there also be a problem in that a uniform field intensity cannot be obtained in a direction perpendicular to the longitudinal direction of the leakage cable 14 since a field intensity decreases as a distance from the leakage cable 14 is increased. Additionally, the leakage cable 14 is expensive.

SUMMARY OF THE INVENTION

It is a general object of the present invention to provide an improved and useful radio communication system between a mobile station on a vehicle and a stationary station in which the above-mentioned problems are eliminated.

A more specific object of the present invention is to provide a radio communication system between a mobile station on a vehicle and a stationary station in which a uniform field intensity is obtained in a direction of a width of a road so that a good communication can be performed irrespective of a position of the vehicle on the road.

In order to achieve the above-mentioned objects, there is provided according to the present invention a radio communication system for a vehicle moving on a road, comprising:

a mobile station provided on the vehicle; and a stationary station communicating with the mobile station, the stationary station including at least one pair of antennas located with the road therebetween so that the antennas generate an electric field having a substantially uniform intensity in a direction of a width of the road.

According to the above-mentioned invention, an electric field having a uniform field intensity is generated between the pair of antennas. Thus, the mobile station can receive a transmission signal in a good condition at any position on the road between the pair of antennas.

Additionally, each of the antennas may comprise an elongated loop antenna extending in a longitudinal direction of the road so that a flat plane formed by a loop of one of the antennas faces a flat plane formed by a loop of the other one of the antennas, and the same transmission signal may be provided to each of the loop antennas forming a pair.

In one embodiment of the present invention, the stationary station may include a plurality of pairs of the antennas consecutively arranged along the road, and phases of carrier waves provided to adjacent antennas may be different from each other. This reduces interference of the electric fields generated by adjacent pairs of antennas.

Further, the phases of carrier waves provided to adjacent antennas may be reversed with respect to each other. Thus, the electric field in an area between the adjacent antennas is completely canceled.

In another embodiment of the present invention, the stationary station may include a plurality of transmission/reception units each of which is connected to the corresponding one of the pairs of antennas and generates a carrier wave provided to the corresponding one of the pairs of the antennas, and the stationary station further includes a signal source generating a synchronization signal and a signal line transmitting the synchronization signal to each of the transmission/reception units.

According to this invention, the phase of the carrier wave generated by each of the transmission/reception units can be controlled by the synchronization signal so that the phases of the carrier waves provided to adjacent pairs of antennas are differentiated or reversed.

In one embodiment of the present invention, the signal line may include a first signal line transmitting the synchronization signal having a normal phase and a second signal line transmitting the synchronization signal having a reversed phase.

Additionally, the signal line may include a first phase adjusting unit for adjusting a phase of the synchronization signal provided to each of the transmission/reception units. The first phase adjusting unit may comprise a plurality of delay lines each of which is provided for the corresponding one of the transmission/reception units, each of the delay lines adjusting a length of a portion of the signal line.

Additionally, the signal line may include a plurality of branch lines each of which is connected to a corresponding one of the transmission/reception units, and each of the branch lines includes a second phase adjusting unit for adjusting a phase of the synchronization signal transmitted to the corresponding one of the transmission/reception units.

The second phase adjusting unit may comprise a delay line which adjusts a length of the corresponding one of the branch lines.

Additionally, a frequency of the synchronization signal may be set lower than a frequency of the carrier wave generated by each of the transmission/reception units.

Further, the frequency of the synchronization signal may be determined based on a frequency of the carrier wave and a length of a portion of the signal line between adjacent transmission/reception units.

The stationary station may include a plurality of monitoring units each of which is connected to a corresponding one of the pairs of the antennas, each of the monitoring units detecting a transmission signal transmitted by an adjacent pair of the antennas.

Additionally, the antenna may comprise an array antenna which includes a plurality of loop antennas arranged in a longitudinal direction of the road.

Other objects, features and advantages of the present invention will become more apparent from the following detailed description when read in conjunction with the accompanying drawings.

BRIEF DESCRIPTION OF THE DRAWINGS

FIG. 12 is an illustration of an antenna system of a stationary station according to an eighth embodiment of the present invention.

DETAILED DESCRIPTION OF THE PREFERRED EMBODIMENTS

Figure 1:
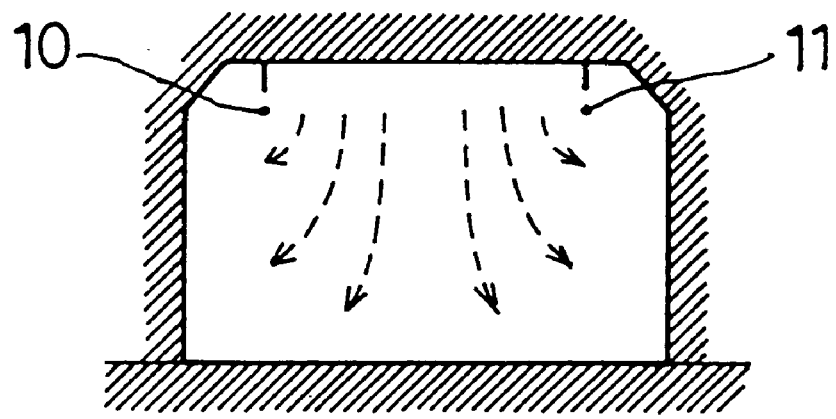
FIG. 1 is an illustration of an AM radio antenna system in a highway tunnel.
Figure 2:
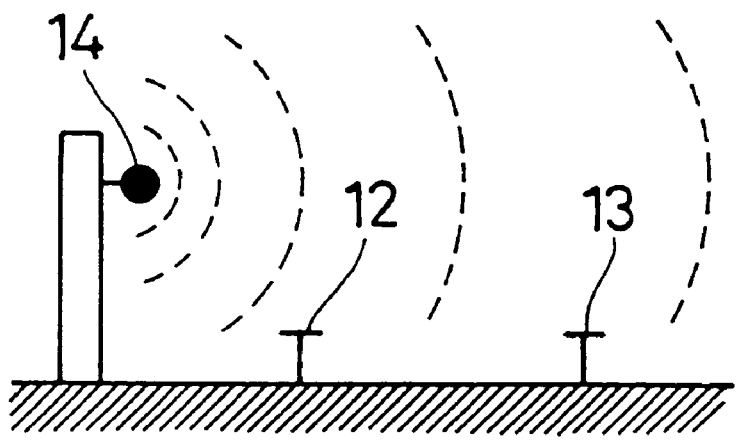
FIG. 2 is an illustration of an antenna system using a leakage cable.
Figure 3:
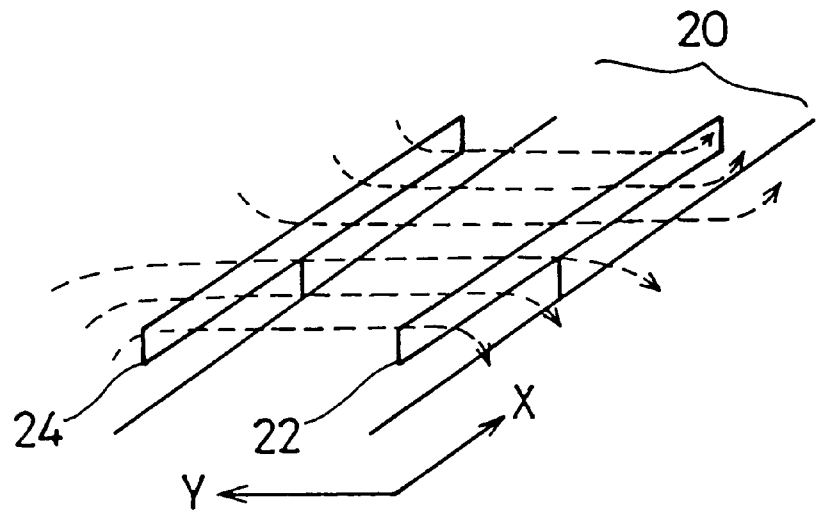
FIG. 3 is a perspective view of an antenna system of a stationary station according to a first embodiment of the present invention.
Figure 4:
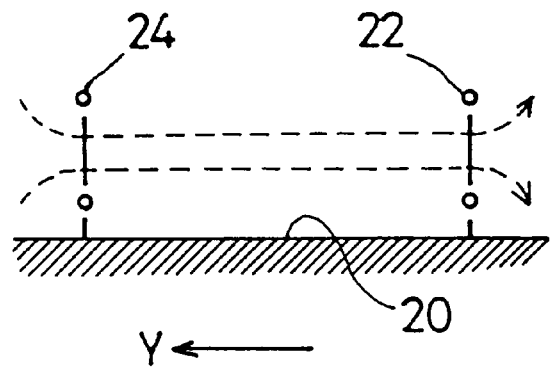
FIG. 4 is an illustration of the antenna system of FIG. 3 viewed in a longitudinal direction of a road along which the antenna system is provided.

A description will now be given of a first embodiment of the present invention. FIG. 3 is a perspective view of an antenna system of a stationary station according to the first embodiment of the present invention. FIG. 4 is an illustration of the antenna system of FIG. 3 viewed in a longitudinal direction of a road along which the antenna system is provided.

In FIG. 3, elongated loop antennas 22 and 24 connected to a stationary station are located on the sides of a road 20. The loop antennas 22 and 24 are arranged so that a flat plane formed by a loop of the loop antenna 22 faces a flat plane formed by a loop of the loop antenna 24 located on the opposite side of the road. Each of the loop antennas 22 and 24 has a length, measured in the longitudinal direction of the road 20, of about one hundred meters (100 m) to several hundred meters. Each of the antennas 22 and 24 is provided with the same transmission signal having the same phase from the same stationary station. A reception signal received by the loop antennas 22 and 24 is provided to the same stationary station. Hereinafter, the stationary station including the pair of the loop antennas 22 and 24 may be referred to as a communication post. It should be noted that a mobile station including an antenna provided on a vehicle can be of a conventional type, and descriptions thereof will be omitted.

When a transmission is performed from the communication post to the mobile station of the vehicle moving on the road 20, the loop antennas 22 and 24 generate a radiation field as shown by dotted arrows in FIG. 3 and FIG. 4. That is, the radiation field generated by the loop antennas 22 and 24 traverses the road 20 in a direction indicated by an arrow Y which is perpendicular to a longitudinal direction of the road 20 indicated by an arrow X. The intensity of the radiation field is uniform along the longitudinal direction of the road 20 over the entire length of the loop antennas 22 and 24. The intensity of the radiation field is also uniform along the direction of the width of the road 20. Accordingly, the mobile station of a vehicle moving on the road 20 can receive a transmission signal always in a stable condition irrespective of a position of the vehicle on the road 20 between the loop antennas 22 and 24. That is, the mobile station can receive a transmission signal always in a good condition irrespective of a distance from one of the sides of the road 20.

When a transmission is performed from the mobile station of the vehicle to the communication post, a transmission signal is received by the loop antennas 22 and 24 and is supplied to a reception circuit of the stationary station. Thus, if the road is divided into a plurality of lanes, a transmission signal transmitted from a vehicle moving on any lane can be received by either one of the loop antennas 22 and 24 in a good condition.

Additionally, when another vehicle, which is moving on a lane between the lane of the mobile station equipped vehicle and the loop antenna 22, is passing the mobile station equipped vehicle, the mobile station can perform communication with the loop antenna 24. Further, when the communication post performs a receiving operation, the loop antennas 22 and 24 may be switched by a diversity method.

If a median strip is provided in the road 20, a pair of loop antennas 22 and 24 may be provided on one of the sides of the road 20 and the median strip, and another pair of the loop antennas 22 and 24 may be provided on the other one of the sides of the road and the median strip. Additionally, antennas of other types such as half wavelength antennas may be used instead of the loop antennas 22 and 24.

Figure 5:
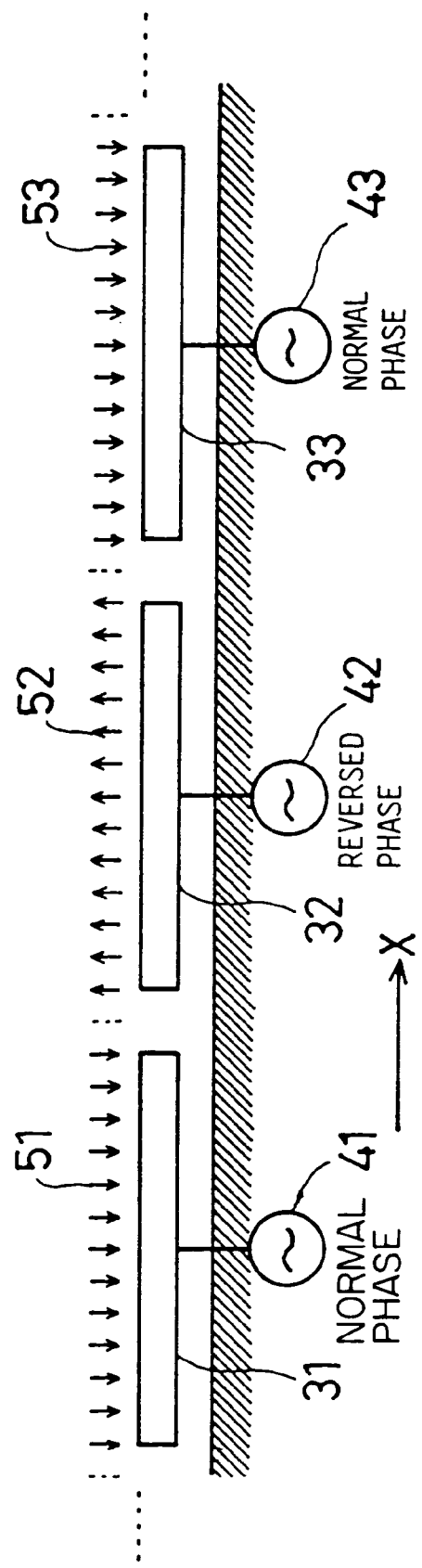
FIG. 5 is an illustration of an antenna system of a stationary station according to a second embodiment of the present invention.

A description will now be given of a second embodiment of the present invention. FIG. 5 is an illustration of an antenna system of a stationary station according to the second embodiment of the present invention. In FIG. 5, loop antennas 31, 32 and 33 are viewed from a center of a road. That is, the loop antennas 31, 32 and 33 are arranged adjacent to each other and located along one of the sides of the road in the longitudinal direction of the road indicated by an arrow X in FIG. 5. Each of the loop antennas 31, 32 and 33 is connected to a respective one of transmission/reception units 41, 42 and 43. Each of the loop antennas 31, 32 and 33 and the corresponding one of the transmission/reception units 41, 42 and 43 constitute a communication post. In addition to the set of the loop antennas 31, 32 and 33, another set of loop antennas (not shown in the figure) are provided on the other side of the road. Each of the loop antennas on the other side makes a pair with a corresponding one of the loop antennas 31, 32 and 33 in a similar manner as that of the pair of the loop antennas 22 and 24 shown in FIGS. 3 and 4. That is, each of the loop antennas on the other side is connected to one of the transmission/reception units 41, 42 and 43 to which one of the loop antennas 31, 32 and 33 making a pair is connected. Accordingly, the loop antenna 31 and the corresponding loop antenna on the other side together generate a radiation field 51 similar to the pair of loop antennas 22 and 24 shown in FIGS. 3 and 4. Similarly, the loop antennas 32 and 33 and the corresponding loop antennas on the other side generate radiation fields 52 and 53, respectively.

The frequency of the carrier wave used by the transmission/reception unit 41 is the same as the frequency of the carrier wave used by the adjacent transmission/reception unit 42. However, the phase of the carrier wave used by the transmission/reception unit 41 is shifted by 180 degrees from the phase of the carrier wave used by the transmission/reception unit 42. That is, the carrier waves used by the adjacent transmission/reception units 41 and 42 have the same frequency but phases are reversed with respect to each other. Similarly, the carrier waves used by the adjacent transmission/reception units 42 and 43 have the same frequency but phases are reversed with respect to each other. Consequently, the directions of the adjacent radiation fields 51 and 52 are reversed with respect to each other, and the directions of the adjacent radiation fields 52 and 53 are reversed with respect to each other. Thus, the radiation fields to be formed in areas between the loop antennas 31 and 32 and between the loop antennas 32 and 33 are canceled. That is a null area is formed in the boundary areas between the radiation fields 51, 52 and 53. Accordingly, the mobile station of the vehicle moving on the road between the pairs of loop antennas receives a transmission signal exclusively from one of the pairs of loop antennas without interference by a radiation field generated by an adjacent pair of loop antennas. This provides a good condition for the radio communication between the mobile station and the stationary station.

In the above-mentioned embodiment, the phases of the carrier waves used by adjacent communication posts are completely reversed with respect to each other. However, the phases are not always required to be completely reversed but are to be different from each other since the radiation fields generated by carrier waves having different phases also provide the cancellation effect. This may also be applied to the embodiments mentioned below. Additionally, although the present embodiment was described with three pairs of loop antennas, the number of pairs of the loop antennas is not limited to three and an arbitrary number of pairs of loop antennas may be used as desired.

A description will be given below of other embodiments in which reversed carrier waves are used by adjacent communication posts.

Figure 6:
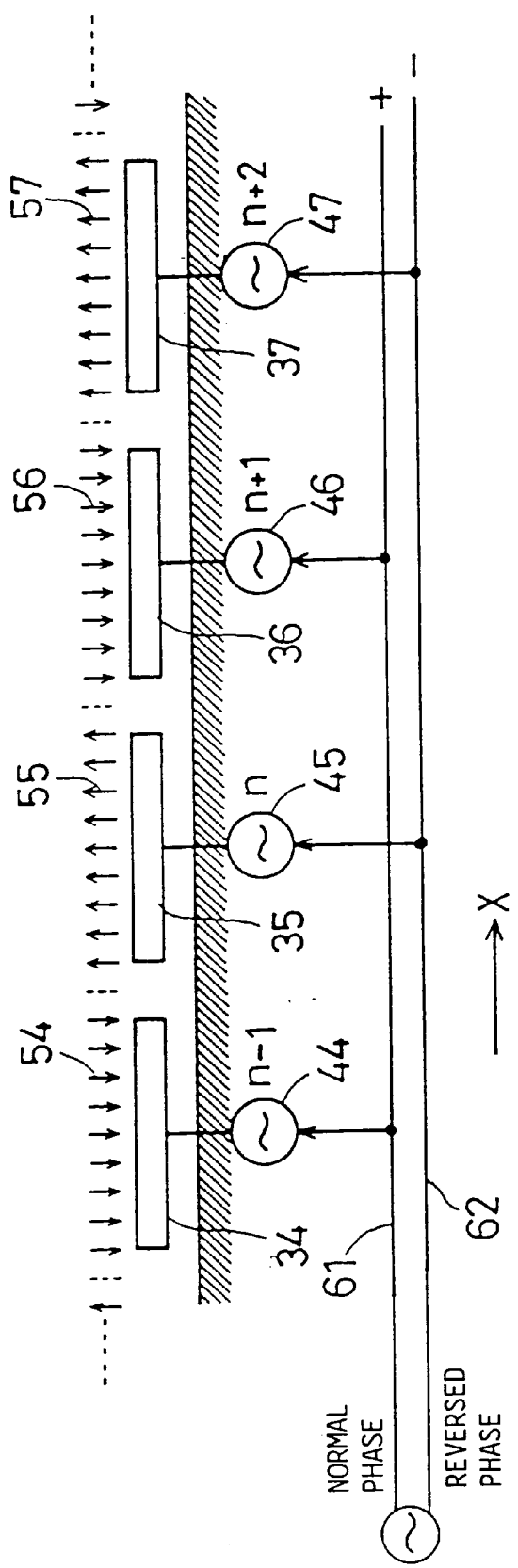
FIG. 6 is an illustration of an antenna system of a stationary station according to a third embodiment of the present invention.

A description will now be given, with reference to FIG. 6, of a third embodiment of the present invention. FIG. 6 is an illustration of an antenna system of a stationary station according to the third embodiment of the present invention. In FIG. 6, loop antennas 34, 35, 36 and 37 are viewed from a center of a road. That is, the loop antennas 34 to 37 are arranged adjacent to each other and are located along one of the sides of the road in the longitudinal direction of the road indicated by an arrow X in FIG. 6. Each of the loop antennas 34 to 37 is connected to a respective one of transmission/reception units 44, 45, 46 and 47. Each of the loop antennas 34 to 37 and the corresponding one of the transmission/reception units 44 to 47 constitute a communication post. In addition to the set of the loop antennas 34 to 37, another set of loop antennas (not shown in the figure) are provided on the other side of the road. Each of the loop antennas on the other side makes a pair with a corresponding one of the loop antennas 34 to 37 in a similar manner as that of the pair of the loop antennas 22 and 24 shown in FIGS. 3 and 4. That is, each of the loop antennas on the other side is connected to one of the transmission/reception units 44 to 47 to which one of the loop antennas 34 to 37 making a pair is connected. Accordingly, the loop antenna 34 and the corresponding loop antenna on the other side together generate a radiation field 54 similar to the pair of loop antennas 22 and 24 shown in FIGS. 3 and 4. Similarly, the loop antennas 35, 36 and 37 and the corresponding loop antennas on the other side generate radiation fields 55, 56 and 57, respectively.

In this embodiment, more than four communication posts, which are respectively numbered 1, . . . , n−1, n, n+1, n+2, . . . , are provided along the road. As shown in FIG. 6, the transmission/reception units 44 and 46, which respectively correspond to the communication posts n−1 and n+1, are connected to a signal line 61 through which a synchronization signal having a normal phase is transmitted. The synchronization signal is generated by a signal source 70 and provided to the signal line 61. On the other hand, the transmission/reception units 45 and 47, which respectively correspond to the communication posts n and n+2, are connected to a signal line 62 to which the synchronization signal having a reversed phase is provided. The synchronization signal having a reversed phase is also generated by the signal source 70 and provided to the single line 62. Accordingly, if the number n is an odd number, the synchronization signal having a normal phase is provided to the even number communication posts, and the synchronization signal having a reversed phase is provided to the odd number communication posts. In other words, the synchronization signals having a normal phase and a reversed phase are alternately provided to the consecutive communication posts. The transmission/reception unit of each of the communication posts generates a carrier wave having a phase corresponding to the phase of the synchronization signal supplied thereto.

Thus, for example, the transmission/reception units 44 and 46 generate a carrier wave having a normal phase, whereas the transmission/reception units 45 and 47 generate a carrier wave having a reversed phase. Consequently, the directions of the adjacent radiation fields 54 and 55 are reversed with respect to each other; the directions of the adjacent radiation fields 55 and 56 are reversed with respect to each other; and the directions of the adjacent radiation fields 56 and 57 are reversed with respect to each other. Thus, the radiation fields to be formed in areas between the loop antennas 34 and 35, between the loop antennas 35 and 36 and between the loop antennas 36 and 37 are canceled. That is a null area is formed in each of the boundary areas between the radiation fields 54, 55, 56 and 57. Accordingly, the mobile station of the vehicle moving on the road between the pairs of loop antennas receives a transmission signal exclusively from one of the pairs of the loop antennas without interference by a radiation field generated by an adjacent pair of loop antennas. This provides a good condition for the radio communication between the mobile station and the stationary station.

Figure 7:
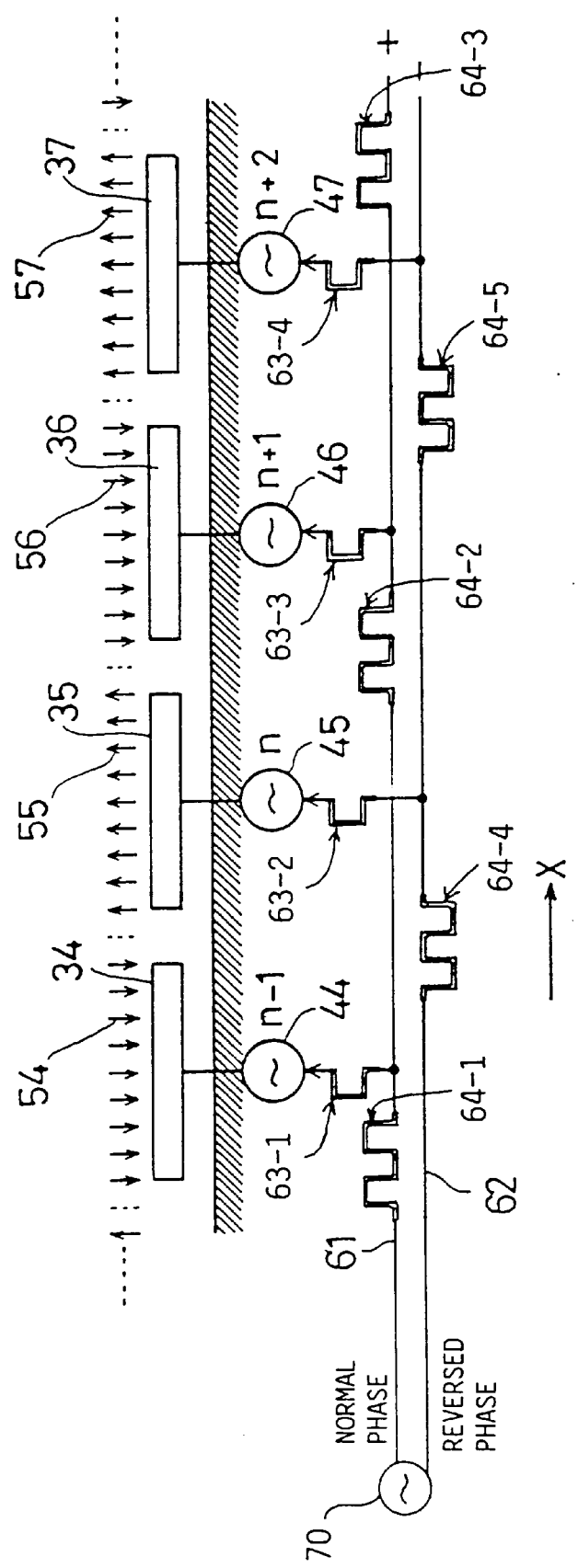
FIG. 7 is an illustration of an antenna system of a stationary station according to a fourth embodiment of the present invention.

A description will now be given, with reference to FIG. 7, of a fourth embodiment of the present invention. FIG. 7 is an illustration of an antenna system of a stationary station according to the fourth embodiment of the present invention. In FIG. 7, parts that are the same as the parts shown in FIG. 6 are given the same reference numerals. In FIG. 7, the loop antennas 34, 35, 36 and 37 are viewed from a center of a road. That is, the loop antennas 34 to 37 are arranged adjacent to each other and are located along one of the sides of the road in the longitudinal direction of the road indicated by an arrow X in FIG. 7. Each of the loop antennas 34 to 37 is connected to a respective one of the transmission/reception units 44, 45, 46 and 47. Each of the loop antennas 34 to 37 and the corresponding one of the transmission/reception units 44 to 47 constitute a communication post. In addition to the set of the loop antennas 34 to 37, another set of loop antennas (not shown in the figure) are provided on the other side of the road. Each of the loop antennas on the other side makes a pair with a corresponding one of the loop antennas 34 to 37 in a similar manner as that of the pair of the loop antennas 22 and 24 shown in FIGS. 3 and 4. That is, each of the loop antennas on the other side is connected to one of the transmission/reception units 44 to 47 to which one of the loop antennas 34 to 37 making a pair is connected. Accordingly, the loop antenna 34 and the corresponding loop antenna on the other side together generate a radiation field 54 similar to the pair of loop antennas 22 and 24 shown in FIGS. 3 and 4. Similarly, the loop antennas 35, 36 and 37 and the corresponding loop antennas on the other side generate radiation fields 55, 56 and 57, respectively.

In this embodiment, more than four communication posts, which are respectively numbered 1, . . . , n−1, n, n+1, n+2, . . . , are provided along the road. As shown in FIG. 7, the transmission/reception units 44 and 46, which respectively correspond to the communication posts n−1 and n+1, are connected to the signal line 61 to which a synchronization signal having a normal phase is provided. On the other hand, the transmission/reception units 45 and 47, which respectively correspond to the communication posts n and n+2, are connected to the signal line 62 to which a synchronization signal having a reversed phase is provided. Accordingly, if the number n is an odd number, the synchronization signal having a normal phase is provided to the even number communication posts, and the synchronization signal having a reversed phase is provided to the odd number communication posts.

Additionally, a portion of the signal line 61 between adjacent connection points to the corresponding communication posts, is provided with a delay line which adjusts the length of the signal line 61 so that the synchronization signal transmitting through that portion of the signal line 61 is delayed by just one period of the carrier wave. Similarly, a portion of the signal line 62 between adjacent connection points to the corresponding communication posts, is provided with a delay line which adjusts the length of the signal line 62 so that the synchronization signal transmitting through that portion of the signal line 62 is delayed by just one period of the carrier wave. That is, in FIG. 7, the delay line 64-1 is provided in a portion of the signal line 61 between the connection points to the transmission posts n−3 (not shown) and n−1; the delay line 64-2 is provided in a portion of the signal line 61 between the connection points to the transmission posts n−1 and n+1; and the delay line 64-3 is provided in a portion of the signal line 61 between the connection points to the transmission posts n+1 and n+3 (not shown). Similarly, the delay line 64-4 is provided in a portion of the signal line 62 between the connection points to the transmission posts n−2 (not shown) and n; and the delay line 64-5 is provided in a portion of the signal line 62 between the connection points to the transmission posts n and n+2.

Additionally, a branch line from each of the connection points on the signal lines 61 and 62 to the respective one of the transmission/reception units is provided with a delay line which adjusts the length of the branch line so that the synchronization signal transmitting through the branch line is delayed by just one half of the period of the carrier wave. That is, in FIG. 7, the delay line 63-1 is provided in the branch line connected to the transmission/reception unit 44; the delay line 63-2 is provided in the branch line connected to the transmission/reception unit 45; the delay line 63-3 is provided in the branch line connected to the transmission/reception unit 46; and the delay line 63-4 is provided in the branch line connected to the transmission/reception unit 47.

In the above-mentioned construction, the synchronization signals having a normal phase and an accurately reversed phase are alternately provided to the consecutive communication posts even when the length of the signal lines 61 and 62 is considerably long or the length of each of the branch lines is considerably long. The transmission/reception unit of each of the communication posts generates a carrier wave having a phase corresponding to the phase of the synchronization signal supplied thereto.

Thus, for example, the transmission/reception units 44 and 46 generate a carrier wave having a normal phase, whereas the transmission/reception units 45 and 47 generate a carrier wave having an accurately reversed phase. Consequently, the directions of the adjacent radiation fields 54 and 55 are accurately reversed with respect to each other; the directions of the adjacent radiation fields 55 and 56 are accurately reversed with respect to each other; and the directions of the adjacent radiation fields 56 and 57 are accurately reversed with respect to each other. Thus, the radiation fields to be formed in areas between the loop antennas 34 and 35, between the loop antennas 35 and 36 and between the loop antennas 36 and 37 are canceled. That is a null area is formed in each of the boundary areas between the radiation fields 54, 55, 56 and 57. Accordingly, the mobile station of the vehicle moving on the road between the pairs of loop antennas receives a transmission signal exclusively from one of the pairs of the loop antennas without interference by a radiation field generated by an adjacent pair of loop antennas. This provides a good condition for the radio communication between the mobile station and the stationary station.

Figure 8:
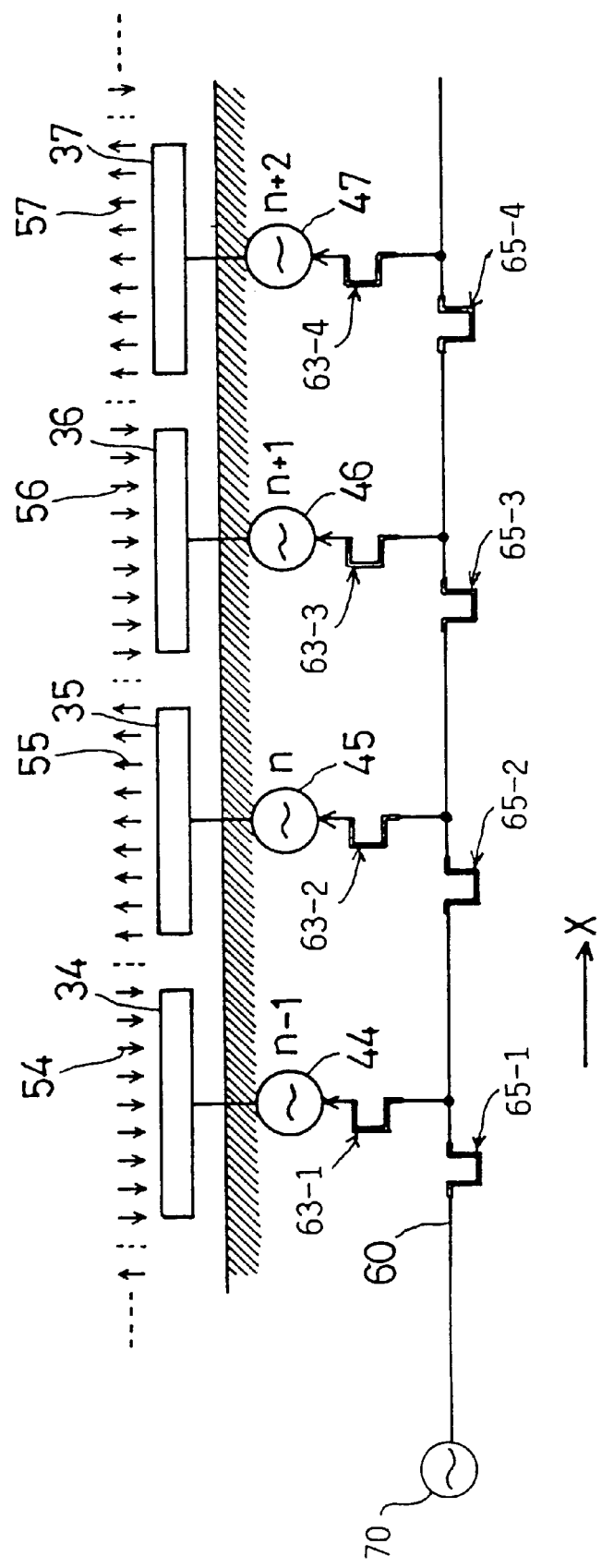
FIG. 8 is an illustration of an antenna system of a stationary station according to a fifth embodiment of the present invention.

A description will now be given, with reference to FIG. 8, of a fifth embodiment of the present invention. FIG. 8 is an illustration of an antenna system of a stationary station according to the fifth embodiment of the present invention. In FIG. 8, parts that are the same as the parts shown in FIGS. 6 and 7 are given the same reference numerals. In FIG. 8, the loop antennas 34, 35, 36 and 37 are viewed from a center of a road. That is, the loop antennas 34 to 37 are arranged adjacent to each other and are located along one of the sides of the road in the longitudinal direction of the road indicated by an arrow X in FIG. 8. Each of the loop antennas 34 to 37 is connected to a respective one of the transmission/ reception units 44, 45, 46 and 47. Each of the loop antennas 34 to 37 and the corresponding one of the transmission/ reception units 44 to 47 constitute a communication post. In addition to the set of the loop antennas 34 to 37, another set of loop antennas (not shown in the figure) are provided on the other side of the road. Each of the loop antennas on the other side makes a pair with a corresponding one of the loop antennas 34 to 37 in a similar manner as that of the pair of the loop antennas 22 and 24 shown in FIGS. 3 and 4. That is, each of the loop antennas on the other side is connected to one of the transmission/reception units 44 to 47 to which one of the loop antennas 34 to 37 making a pair is connected. Accordingly, the loop antenna 34 and the corresponding loop antenna on the other side together generate a radiation field 54 similar to the pair of loop antennas 22 and 24 shown in FIGS. 3 and 4. Similarly, the loop antennas 35, 36 and 37 and the corresponding loop antennas on the other side generate radiation fields 55, 56 and 57, respectively.

In this embodiment, more than four communication posts, which are respectively numbered 1, . . . , n−1, n, n+1, n+2, . . . , are provided along the road. As shown in FIG. 8, the transmission/reception units 44, 45, 46 and 47 which respectively correspond to the communication posts n−1, n, n+1 and n+2 are connected to a single signal line 60 to which a synchronization signal is provided.

Additionally, a portion of the signal line 60 between adjacent connection points to the corresponding communication posts, is provided with a delay line which adjusts the length of the signal line 60 so that the synchronization signal transmitting through that portion of the signal line 60 is delayed by just one half of the period of the carrier wave. That is, in FIG. 8, the delay line 65-1 is provided in a portion of the signal line 60 between the connection points to the transmission posts n−2 (not shown) and n−1; the delay line 65-2 is provided in a portion of the signal line 61 between the connection points to the transmission posts n−1 and n; the delay line 65-3 is provided in a portion of the signal line 60 between the connection points to the transmission posts n and n+1; and the delay line 65-4 is provided in a portion of the signal line 60 between the connection points to the transmission posts n+1 and n+2.

Additionally, the branch line from each of the connection points on the signal line 60 to the respective one of the transmission/reception units is provided with the delay line which adjusts the length of the branch line so that the synchronization signal transmitting through the branch line is delayed by just one half of the period of the carrier wave. That is, in FIG. 8, the delay line 63-1 is provided in the branch line connected to the transmission/reception unit 44; the delay line 63-2 is provided in the branch line connected to the transmission/reception unit 45; the delay line 63-3 is provided in the branch line connected to the transmission/ reception unit 46; and the delay line 63-4 is provided in the branch line connected to the transmission/reception unit 47.

In the above-mentioned construction, the synchronization signals having a normal phase and an accurately reversed phase are alternately provided to the consecutive communication posts even when the length of the single signal line 60 is considerably long or the length of each of the branch lines is considerably long. The transmission/reception unit of each of the communication posts generates a carrier wave having a phase corresponding to the phase of the synchronization signal supplied thereto.

Thus, for example, the transmission/reception units 44 and 46 generate a carrier wave having a normal phase, whereas the transmission/reception units 45 and 47 generate a carrier wave having an accurately reversed phase. Consequently, the directions of the adjacent radiation fields 54 and 55 are accurately reversed with respect to each other; the directions of the adjacent radiation fields 55 and 56 are accurately reversed with respect to each other; and the directions of the adjacent radiation fields 56 and 57 are accurately reversed with respect to each other. Thus, the radiation fields to be formed in areas between the loop antennas 34 and 35, between the loop antennas 35 and 36 and between the loop antennas 36 and 37 are canceled. That is a null area is formed in each of the boundary areas between the radiation fields 54, 55, 56 and 57. Accordingly, the mobile station of the vehicle moving on the road between the pairs of loop antennas receives a transmission signal exclusively from one of the pairs of the loop antennas without interference by a radiation field generated by an adjacent pair of loop antennas. This provides a good condition for the radio communication between the mobile station and the stationary station.

Figure 9:
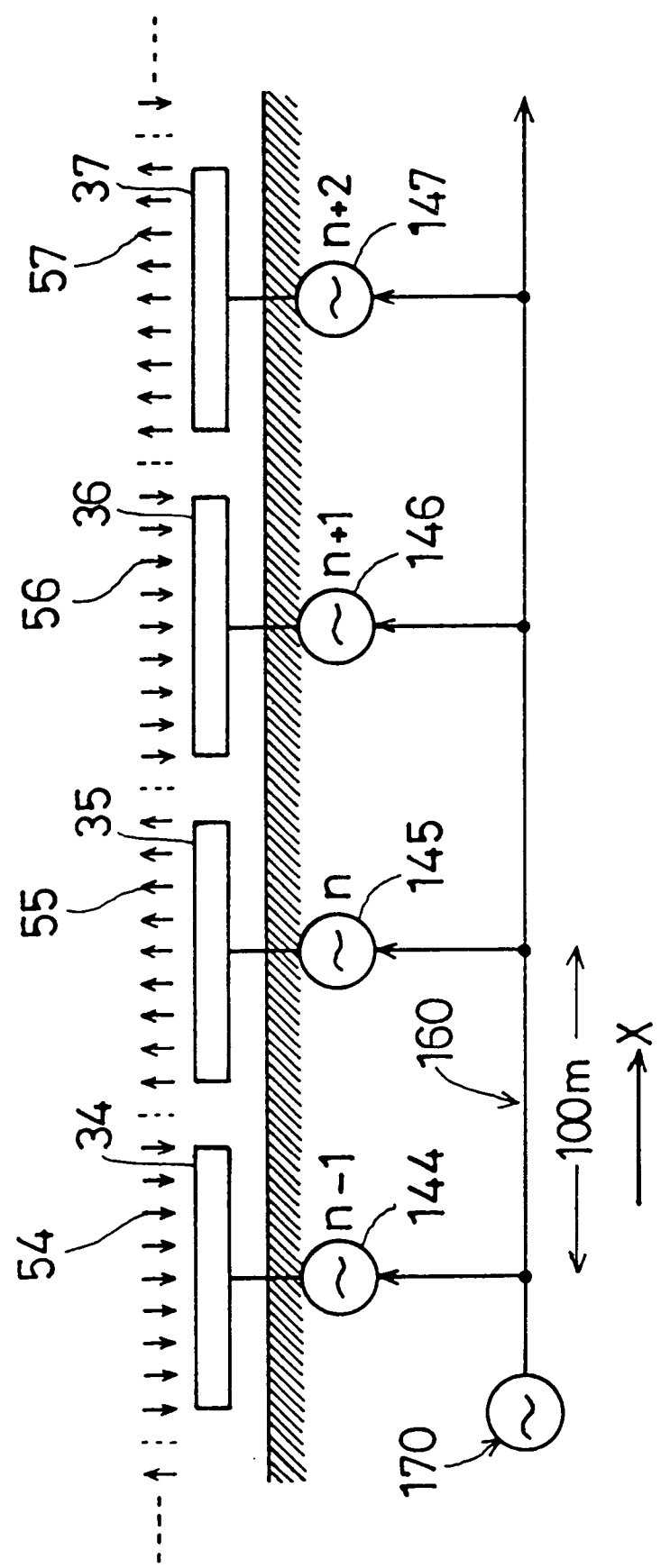
FIG. 9 is an illustration of an antenna system of a stationary station according to a sixth embodiment of the present invention.

A description will now be given, with reference to FIG. 9, of a sixth embodiment of the present invention. FIG. 9 is an illustration of an antenna system of a stationary station according to the sixth embodiment of the present invention. In FIG. 9, parts that are the same as the parts shown in FIG. 6 are given the same reference numerals. In FIG. 9, the loop antennas 34, 35, 36 and 37 are viewed from a center of a road. That is, the loop antennas 34 to 37 are arranged adjacent to each other and are located along one of the sides of the road in the longitudinal direction of the road indicated by an arrow X in FIG. 9. Each of the loop antennas 34 to 37 is connected to a respective one of transmission/reception units 144, 145, 146 and 147. Each of the loop antennas 34 to 37 and the corresponding one of the transmission/ reception units 144 to 147 constitute a communication post. In addition to the set of the loop antennas 34 to 37, another set of loop antennas (not shown in the figure) are provided on the other side of the road. Each of the loop antennas on the other side makes a pair with a corresponding one of the loop antennas 34 to 37 in a similar manner as that of the pair of the loop antennas 22 and 24 shown in FIGS. 3 and 4. That is, each of the loop antennas on the other side is connected to one of the transmission/reception units 144 to 147 to which one of the loop antennas 34 to 37 making a pair is connected. Accordingly, the loop antenna 34 and the corresponding loop antenna on the other side together generate a radiation field 54 similar to the pair of loop antennas 22 and 24 shown in FIGS. 3 and 4. Similarly, the loop antennas 35, 36 and 37 and the corresponding loop antennas on the other side generate radiation fields 55, 56 and 57, respectively.

In this embodiment, more than four communication posts, which are respectively numbered 1, . . . , n−1, n n+1, n+2, . . . , are provided along the road. As shown in FIG. 9, the transmission/reception units 144, 145, 146 and 147 which respectively correspond to the communication posts n−1, n, n+1 and n+2 are connected to a single signal line 160 to which a synchronization signal is provided from a signal source 170. The synchronization signal generated by the signal source 170 has a frequency sufficiently lower than the frequency of the carrier wave generated by the transmission/ reception units 144, 145, 146 and 147.

For example, it is assumed that the length of a portion of the signal line 160 between adjacent connection points to the corresponding transmission/reception units is equal to one hundred meters (100 m), and the frequency of the carrier wave generated by the transmission/reception units 144 to 147 is equal to 800 MHz, and it is desired to reduce a interference level of the carrier waves generated by the adjacent pairs of loop antennas to below it. In this case, the phase of the carrier wave provided to one pair of the loop antennas must be reversed with an allowable limit range of ±0.573 degrees relative to the phase of the carrier wave provided to the adjacent pair of the loop antennas. The allowable limit range ±0.573 degrees is converted into a time value of ±7.95 psec when the frequency of 800 MHz is used for the carrier wave.

If the frequency of the synchronization signal generated by the signal source 170 is set to 1 KHz, a shift in the phase of the synchronization signal between adjacent pairs of the loop antennas becomes approximately equal to 1/3,000 since the length of the portion of the signal line 160 between adjacent connection points is one hundred meters (100 m). Thus, the shift in the phase of the carrier waves generated by adjacent transmission/reception units falls within approximately 0.12 degrees which is sufficiently smaller than the allowable limit range ±0.573 degrees. That is, the shift in the phase of the carrier wave generated by the adjacent communication posts can be reduced by using a synchronization signal having a frequency sufficiently smaller than the frequency of the carrier wave used by the transmission posts.

In the above-mentioned construction, the transmission/reception unit of each of the communication posts generates a carrier wave based on the synchronization signal supplied thereto so that carrier waves having a normal phase and an accurately reversed phase are alternately generated by adjacent communication posts.

Thus, for example, the transmission/reception units 144 and 146 generate a carrier wave having a normal phase, whereas the transmission/reception units 145 and 147 generate a carrier wave having an accurately reversed phase. Consequently, the directions of the adjacent radiation fields 54 and 55 are accurately reversed with respect to each other; the directions of the adjacent radiation fields 55 and 56 are accurately reversed with respect to each other; and the directions of the adjacent radiation fields 56 and 57 are accurately reversed with respect to each other. Thus, the radiation fields to be formed in areas between the loop antennas 34 and 35, between the loop antennas 35 and 36 and between the loop antennas 36 and 37 are canceled. That is a null area is formed in each of the boundary areas between the radiation fields 54, 55, 56 and 57. Accordingly, the mobile station of the vehicle moving on the road between the pairs of loop antennas receives a transmission signal exclusively from one of the pairs of the loop antennas without interference by a radiation field generated by an adjacent pair of loop antennas. This provides a good condition for the radio communication between the mobile station and the stationary station.

Additionally, in this embodiment, since no delay line is provided to the signal line 160, a simple construction is provided for the communication posts.

Figure 10:
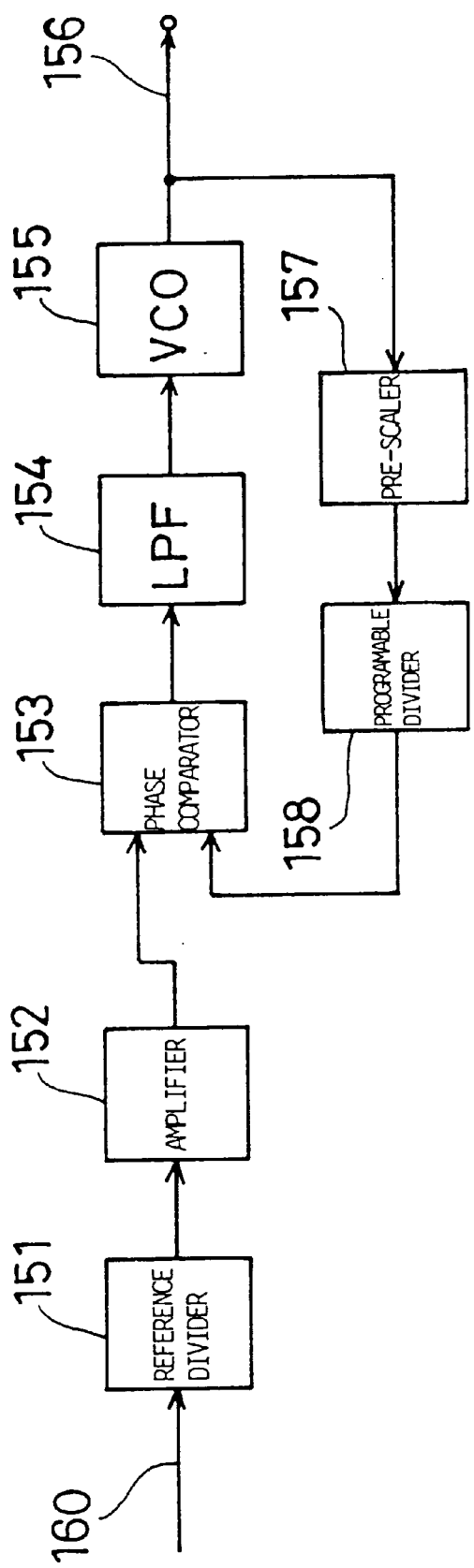
FIG. 10 is a block diagram of a carrier wave generating unit provided in a transmission/reception unit.

FIG. 10 is a block diagram of a carrier wave generating unit provided in each of the transmission/reception units 144 to 147. The carrier wave generating unit comprises a reference divider 151, an amplifier 152, a phase comparator 153, a low-pass filter (LPF) 154, a voltage-controlled oscillator (VCO) 155, an output terminal 156, a pre-scaler 157 and a programmable divider 158.

The synchronization signal transmitted through the signal line 160 is supplied to the reference divider 151. The frequency of the synchronization signal is divided by a predetermined dividing ratio in the reference divider 151, and supplied to the amplifier 152. The divided synchronization signal is amplified and then supplied to the phase comparator 153. As for the amplifier 152, an inverting amplifier or a non-inverting amplifier may be used as necessity requires. The phase comparator 153 compares the phase of the synchronization signal supplied by the amplifier 152 with the phase of an output signal of the programmable divider 158 so as to generate a phase difference signal. The phase difference signal is passed through the low-pass filter 154 to eliminate unnecessary high-frequency components, and then is supplied to the voltage-controlled oscillator 155.

The voltage-controlled oscillator 155 shifts an oscillation frequency in a direction to eliminate the phase difference detected by the phase comparator 153. The voltage-controlled oscillator 155 generates a carrier wave signal having a frequency of 800 MHz, for example, and supplies the carrier wave signal to a post-stage circuit such as a modulation circuit through the output terminal 156. Additionally, the carrier wave signal is supplied to the pre-scaler 157 so as to be divided by a predetermined dividing ratio. Then the carrier wave signal is supplied to the programmable divider 158. The dividing ratio of the programmable divider 157 is set to a ratio by which the frequency of the output signal of the programmable divider 158 becomes equal to the frequency of the synchronization signal output from the amplifier 152. The output signal of the programmable divider 158 is supplied to the phase comparator 153 as mentioned above. The phase comparator 153, the low-pass filter 154, the voltage-controlled oscillator 155, the pre-scaler 157 and the programmable divider 158 together constitute a phase locked loop (PLL) circuit. Thus, the carrier wave signal output from the voltage controlled oscillator 155 synchronizes with the synchronization signal supplied from the signal line 160.

It should be noted that the above-mentioned carrier wave generating unit may be used in the transmission/reception units provided in other embodiments described in this specification.

Figure 11:
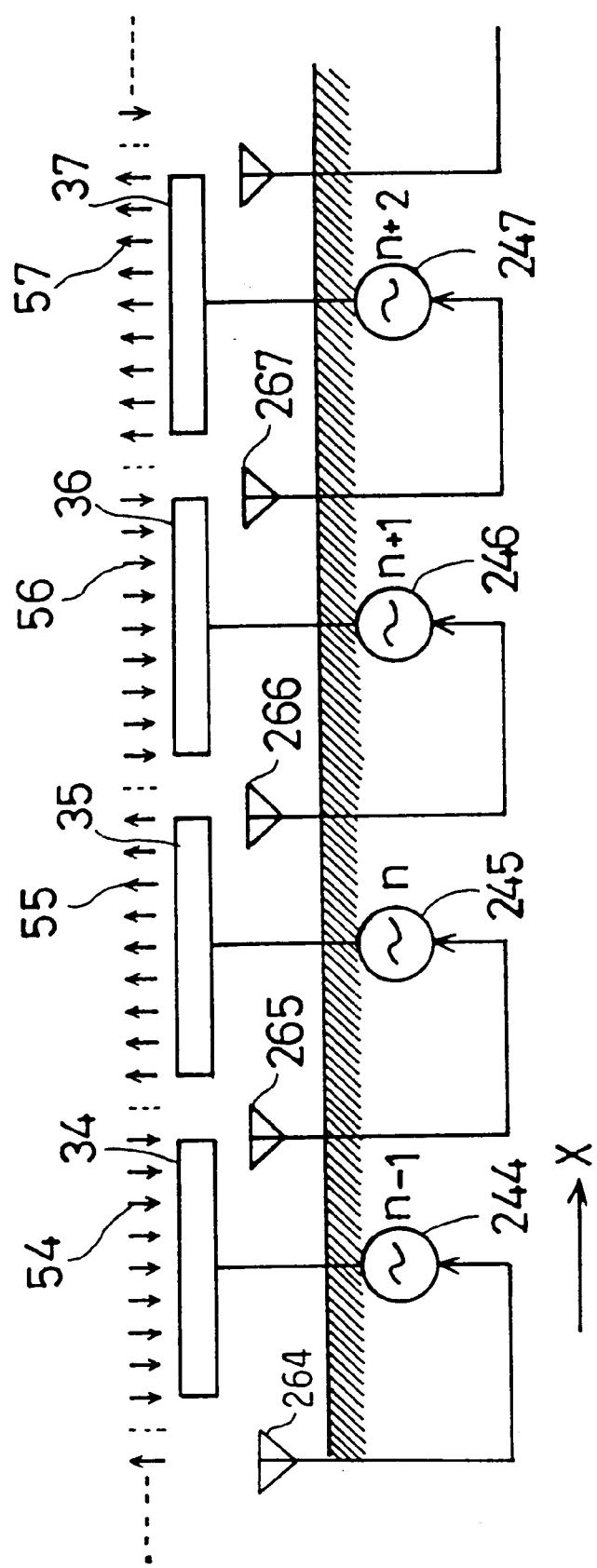
FIG. 11 is an illustration of an antenna system of a stationary station according to a seventh embodiment of the present invention.

A description will now be given, with reference to FIG. 11, of a seventh embodiment of the present invention. FIG. 11 is an illustration of an antenna system of a stationary station according to the seventh embodiment of the present invention. In FIG. 11, parts that are the same as the parts shown in FIG. 6 are given the same reference numerals. In FIG. 11, the loop antennas 34, 35, 36 and 37 are viewed from a center of a road. That is, the loop antennas 34 to 37 are arranged adjacent to each other and are located along one of the sides of the road in the longitudinal direction of the road indicated by an arrow X in FIG. 11. Each of the loop antennas 34 to 37 is connected to a respective one of transmission/reception units 244, 245, 246 and 247. Each of the loop antennas 34 to 37 and the corresponding one of the transmission/reception units 244 to 247 constitute a communication post. In addition to the set of the loop antennas 34 to 37, another set of loop antennas (not shown in the figure) are provided on the other side of the road. Each of the loop antennas on the other side makes a pair with a corresponding one of the loop antennas 34 to 37 in a similar manner as that of the pair of the loop antennas 22 and 24 shown in FIGS. 3 and 4. That is, each of the loop antennas on the other side is connected to one of the transmission/reception units 244 to 247 to which one of the loop antennas 34 to 37 making a pair is connected. Accordingly, the loop antenna 34 and the corresponding loop antenna on the other side together generate a radiation field 54 similar to the pair of loop antennas 22 and 24 shown in FIGS. 3 and 4. Similarly, the loop antennas 35, 36 and 37 and the corresponding loop antennas on the other side generate radiation fields 55, 56 and 57, respectively.

In this embodiment, more than four communication posts, which are respectively numbered 1, . . . n−1, n, n−1, n+2, . . . , are provided along the road. As shown in FIG. 11, the transmission/reception units 244, 245, 246 and 247 which respectively correspond to the communication posts n−1, n, n+1 and n+2 are connected to a corresponding one of the detection antennas 264, 265, 266 and 267. Each of the detection antennas 264 to 267 is provided for monitoring a transmission signal of the loop antenna adjacent to the loop antenna to which the detection antenna is connected. That is, in FIG. 11, for example, the detection antenna 265 monitors a transmission signal of the loop antenna 34 and supplies the detected signal to the transmission/reception unit 245. In each of the transmission/reception units, the detected signal is supplied to the reference divider 151 shown in FIG. 10 after the detected signal is amplified to a predetermined level and the frequency of the detected signal is inverted.

Thus, for example, the transmission/reception units 244 and 246 generate a carrier wave having a normal phase, whereas the transmission/reception units 245 and 247 generate a carrier wave having an accurately reversed phase. Consequently, the directions of the adjacent radiation fields 54 and 55 are accurately reversed with respect to each other; the directions of the adjacent radiation fields 55 and 56 are accurately reversed with respect to each other; and the directions of the adjacent radiation fields 56 and 57 are accurately reversed with respect to each other. Thus, the radiation fields to be formed in areas between the loop antennas 34 and 35, between the loop antennas 35 and 36 and between the loop antennas 36 and 37 are canceled. That is a null area is formed in each of the boundary areas between the radiation fields 54, 55, 56 and 57. Accordingly, the mobile station of the vehicle moving on the road between the pairs of loop antennas receives a transmission signal exclusively from one of the pairs of the loop antennas without interference by a radiation field generated by an adjacent pair of loop antennas. This provides a good condition for the radio communication between the mobile station and the stationary station.

In this embodiment, since no signal line connecting all communication posts is provided, a simple construction is provided for the installation of the communication posts. It should be noted that a carrier wave generated by the first communication post among the consecutively arranged communication posts may have an arbitrary phase.

A description will now be given, with reference to FIG. 12, of an eighth embodiment of the present invention. FIG. 12 is an illustration of an antenna system of a stationary station according to the eighth embodiment of the present invention. In FIG. 12, parts that are the same as the parts shown in FIGS. 9 are given the same reference numerals. In FIG. 12, array antennas 134, 135, 136 and 137 are viewed from a center of a road. That is, the array antennas 134 to 137 are arranged adjacent to each other and are located along one of the sides of the road in the longitudinal direction of the road indicated by an arrow X in FIG. 12. Each of the array antennas 134 to 137 comprises a plurality of loop antennas each of which faces the center of the road. For example, the array antenna 134 comprises four loop antennas 241, 242, 243 and 244. The loop antennas 241 to 244 are arranged in the longitudinal direction of the road along the roadside. Other array antennas 135 to 137 have the same construction.

Each of the array antennas 134 to 137 is connected to a respective one of the transmission/reception units 144, 145, 146 and 147. Each of the array antennas 134 to 137 and the corresponding one of the transmission/reception units 144 to 147 constitute a communication post. In addition to the set of the array antennas 134 to 137, another set of array antennas (not shown in the figure) are provided on the other side of the road. Each of the array antennas on the other side makes a pair with a corresponding one of the array antennas 134 to 137 in a similar manner as that of the pair of the loop antennas 22 and 24 shown in FIGS. 3 and 4. That is, each of the array antennas on the other side is connected to one of the transmission/reception units 144 to 147 to which one of the array antennas 134 to 137 making a pair is connected. Accordingly, the array antenna 134 and the corresponding array antenna on the other side together generate a radiation field 54 similar to the pair of loop antennas 22 and 24 shown in FIGS. 3 and 4. Similarly, the array antennas 135, 136 and 137 and the corresponding array antennas on the other side generate radiation fields 55, 56 and 57, respectively.

In this embodiment, more than four communication posts, which are respectively numbered 1, , n−1, n, n+1, n+2, . . . , are provided along the road. As shown in FIG. 12, the transmission/reception units 144, 145, 146 and 147 which respectively correspond to the communication posts n−1, n, n+1 and n+2 are connected to the single signal line 160 to which a synchronization signal is provided from the signal source 170. The synchronization signal generated by the signal source 170 has a frequency sufficiently lower than the frequency of the carrier wave generated by the transmission/reception units 144, 145, 146 and 147.

In the above-mentioned construction, the transmission/reception unit of each of the communication posts generates a carrier wave based on the synchronization signal supplied thereto so that carrier waves having a normal phase and an accurately reversed phase are alternately generated by adjacent communication posts.

Thus, for example, the transmission/reception units 144 and 146 generate a carrier wave having a normal phase, whereas the transmission/reception units 145 and 147 generate a carrier wave having an accurately reversed phase. Consequently, the directions of the adjacent radiation fields 54 and 55 are accurately reversed with respect to each other; the directions of the adjacent radiation fields 55 and 56 are accurately reversed with respect to each other; and the directions of the adjacent radiation fields 56 and 57 are accurately reversed with respect to each other. Thus, the radiation fields to be formed in areas between the array antennas 134 and 135, between the array antennas 135 and 136 and between the array antennas 136 and 137 are canceled. That is a null area is formed in each of the boundary areas between the radiation fields 54, 55, 56 and 57. Accordingly, the mobile station of the vehicle moving on the road between the pairs of array antennas receives a transmission signal exclusively from one of the pairs of the array antennas without interference by a radiation field generated by an adjacent pair of array antennas. This provides a good condition for the radio communication between the mobile station and the stationary station.

Additionally, in this embodiment, each of the array antennas 134 to 137 can be divided into a plurality of components corresponding to the loop antennas. That is, for example, if the length of the array antenna 134 is one hundred meters (100 m), the array antenna 134 can be separated into four loop antennas 241 to 244 each of which has a length of twenty-five meters (25 m). This provided an easy constructing operation of the array antennas.

Additionally, in this embodiment, a power supplied to each of the loop antennas constituting a single array antenna can be separately controlled so that a further uniform radiation field is generated which provides a good condition for a communication between the mobile station and the stationary station. It should be noted that the array antenna used in this embodiment may be used in other embodiments described in this specification.

The present invention is not limited to the specifically disclosed embodiments, and variations and modifications may be made without departing from the scope of the present invention.

What is claimed is:

1. A radio communication system for a vehicle traveling on a road, comprising:

a mobile station provided on said vehicle; and a stationary station communicating with said mobile station, said stationary station including at least one pair of antennas located with said road therebetween, each antenna of said pair comprising an elongated loop antenna extending along a longitudinal direction of said road such that a flat plane formed by a loop of one of said antennas faces a flat plane formed by a loop of the other one of said antennas;

wherein said pair of antennas generate an electric field having a substantially uniform intensity along the length of the elongated loop antenna and across the width of said road and each antenna of said pair contains an identical transmission signal having identical phase information.

2. A radio communication system for a vehicle traveling on a road, comprising:

a mobile station provided on said vehicle; and a stationary station communicating with said mobile station, said stationary station including a plurality of antenna pairs, each antenna of said plurality of antenna pairs being located with said road therebetween, each antenna pair consecutively arranged along a longitudinal direction of said road and having carrier waves with phases that differ from carrier wave phases of adjacent antenna pairs;

wherein said plurality of antenna pairs generates an electric field having a substantially uniform intensity along the length of said consecutively arranged antennas and across the width of said road.

3. The radio communication system of claim 2, wherein each antenna pair contains carrier wave phases that are reversed from the carrier wave phases of adjacent antenna pairs.

4. The radio communication system of claim 2, wherein said stationary station includes a plurality of transmission/reception units, each of said transmission/reception units being connected to, and generating a carrier provided to, a corresponding one of said antenna pairs, and said stationary station further includes a signal source generating a synchronization signal and a signal line transmitting the synchronization signal to each of said transmission/reception units.

5. The radio communication system of claim 4 wherein said signal line includes a first signal line transmitting the synchronization signal having a normal phase and a second signal line transmitting the synchronization signal having a reversed phase.

6. The radio communication system of claim 4, wherein said signal line includes a first phase adjusting unit for adjusting a phase of said synchronization signal provided to each of said transmission/reception units.

7. The radio communication system of claim 6, wherein said first phase adjusting unit comprises a plurality of delay lines, each of which is provided for a corresponding one of said transmission/reception units, each of said delay lines adjusting a length of a portion of said signal lines.

8. The radio communication system of claim 4, wherein said signal line includes a plurality of branch lines, each of which is connected to a corresponding one of said transmission/reception units, and each of said branching lines includes a second phase adjusting unit for adjusting a phase of said synchronization signal transmitted to the corresponding one of said transmission/reception units.

9. The radio communication system of claim 8, wherein said second phase adjusting unit comprises a delay line which adjusts a length of the corresponding one of said branch lines.

10. The radio communication system of claim 4, wherein a frequency of said synchronization signal is set lower than a frequency of the carrier wave generated by each of said transmission/reception units.

11. The radio communication system of claim 10, wherein a frequency of said synchronization signal is determined based on a frequency of the carrier wave and a length of a portion of said signal line between adjacent transmission/reception units.

12. The radio communication system of claim 3, wherein said stationary station includes a plurality of monitoring units, each of which is connected to a corresponding one of said antenna pairs, each of said monitoring units detecting a transmission signal transmitted by an adjacent antenna pair.

13. A radio communication system for a vehicle traveling on a road, comprising:

a mobile station provided on said vehicle; and a stationary station communicating with said mobile station, said stationary station including at least one pair of antennas located with said road therebetween, each antenna of said pair comprising an array antenna containing a plurality of loop antennas arranged along a longitudinal direction of said road;

wherein said pair of antennas generate an electric field having a substantially uniform intensity along the length of said array antenna and across the width of said road and each antenna of said pair contains an identical transmission signal having identical phase information.

* * * * *